July 14, 1959     K. E. HUMBERT, JR     2,894,630
MOUNTING AND ADAPTER FOR SCREW NECK TYPE FILTER
Filed March 29, 1955     2 Sheets-Sheet 1
FIG. 1.
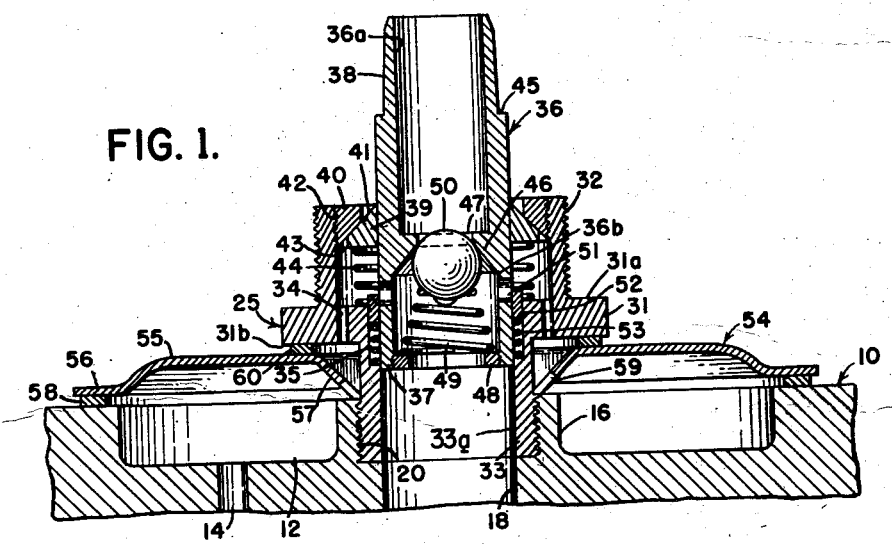
FIG. 5.     FIG. 4.     FIG. 6.
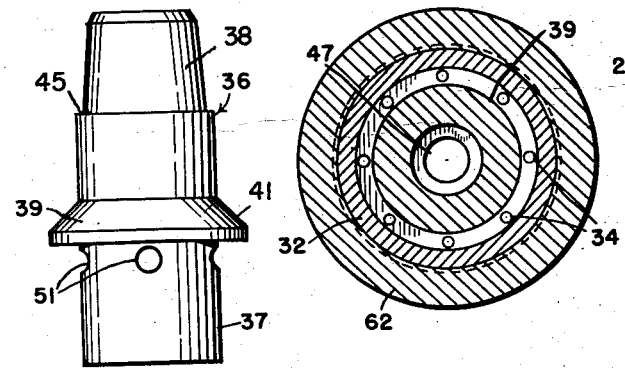 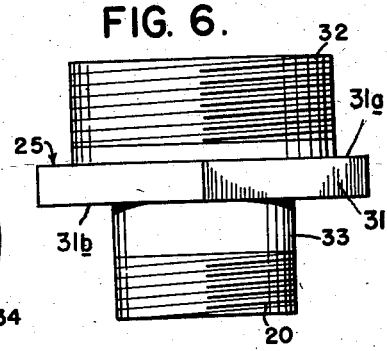
FIG. 7
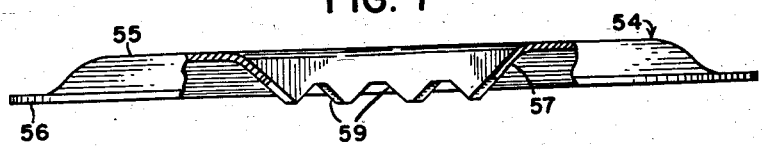
FIG. 8
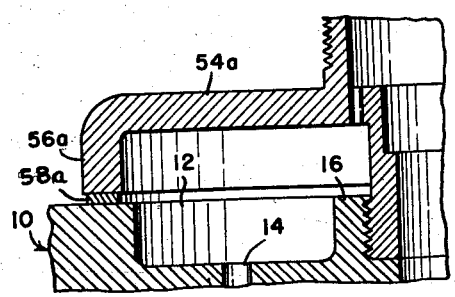
INVENTOR
KINGSLEY E. HUMBERT, JR.
BY *Shoemaker & Mattare*
ATTORNEYS July 14, 1959     K. E. HUMBERT, JR     2,894,630
MOUNTING AND ADAPTER FOR SCREW NECK TYPE FILTER
Filed March 29, 1955     2 Sheets-Sheet 2

INVENTOR
KINGSLEY E. HUMBERT, JR.
BY
ATTORNEYS

United States Patent Office

2,894,630
Patented July 14, 1959

2,894,630

MOUNTING AND ADAPTER FOR SCREW NECK TYPE FILTER

Kingsley E. Humbert, Jr., Gastonia, N.C., assignor to Wix Corporation, Gastonia, N.C., a corporation of North Carolina Application March 29, 1955, Serial No. 497,605

16 Claims. (Cl. 210—133)

This invention relates generally to filters of the type used on internal combustion engines and is directed particularly to an improved mounting or support for filters of the screw-on type.

In certain makes of motor vehicles use is made of filters of the full flow type wherein the engine oil passes out or is pumped out from the engine into the filter and then flows directly back to the oil gallery for reuse. In such a system, the oil flow is unrestricted and is maintained in proper amount so long as the filter is in a condition to permit the oil to pass freely therethrough. However, after a period of use the filter begins to accumulate particles or becomes dirty and the flow is, accordingly, cut down or reduced and greater pressure is required to force the oil therethrough. When the filter reaches a condition where it is completely clogged the oil flow to the engine bearings will be shut-off since in full flow systems no by-pass provisions are made. Continued operation of the engine under such conditions can, therefore, result in serious damage to the engine bearings.

In the light of the foregoing it is a particular object of the present invention to provide a new mounting for the filter whereby the development of a condition such as that above described, when the filter becomes dirty or clogged, will be completely avoided so that failure to replace the clogged filter will not result in harm or damage to the lubricated engine parts.

Replaceable filters for motor vehicle engines are also provided as unitary structures which are mounted on the engine wall or block by a screw threaded coupling or by the use of bolts and such filters are, accordingly, designed to be taken off as a unit and discarded when dirty for replacement by a complete new unit. In the making of such replacement, if the job is not carefully done, the unit may work loose, under the effect of vibration, and either come off completely or become loose to such an extent that oil will be lost from the system.

Another object, accordingly, in view of the foregoing, is to provide, in a manner as hereinafter set forth, a mounting for a screw-on type filter which is designed to prevent the loss of oil from the system if the filter unit falls off or if it becomes loose to any considerable extent.

Another object of the invention is to provide, in a manner as hereinafter set forth, a mounting for a screw-on type filter which, in the event that the filter becomes loose or completely separated from the mounting, will function to prevent the escape of oil from the system but will permit the oil to continue to circulate or, in other words, will not shut-off the flow of oil to the oil gallery and from there to the engine parts in the conventional manner.

Still another object of the invention is to provide, in a manner as hereinafter set forth, a mounting for a screw-on type oil filter in a full flow system, wherein a means is provided for by-passing the oil directly back to the oil gallery in the event that the filter unit becomes so clogged that the oil will no longer pass therethrough.

A still further object of the invention is to provide, in a manner as hereinafter set forth, a mounting for a filter of the character stated which will by-pass a portion of the oil if the pressure in the oil system rises to an unusual degree, so that the filter element will not be subjected to the greatly increased pressure but only part of the oil will flow therethrough, the remaining part being by-passed in unfiltered condition.

A still further object of the invention is to provide, in a manner as hereinafter set forth, a novel adapter whereby the mounting of the above described character may be set in position by utilizing the existing ports provided for the installation of the presently used screw-on type filter.

The foregoing and possibly other objects are attained by the provision of a body having, as an integral part thereof, an outer tubular nipple and an oppositely directed inner tubular stud which opens through the body into the nipple and is coaxial with the nipple. This stud is externally screw threaded for engagement in the threaded socket conventionally provided for the attachment of the screw-on type filter to the engine body. Cooperating with the body, nipple and stud is a valve tube having an inner end or stem end portion which is slidably inserted into the stud through the nipple and having an outer oil inlet end portion which extends through the nipple beyond the free or outer end of the latter. The valve tube is of an overall diameter materially less than the inside diameter of the nipple and coacting valve elements are carried by the nipple and the inlet end portion of the tube which when engaged prevent the flow of oil through the nipple to a filter unit attached to the nipple. Means is provided for introducing oil through the body into the nipple to flow between the valve elements when the tube is shifted inwardly against the resistance of a spring element normally urging movement of the tube in a direction to bring the valve elements into closed relation.

The valve tube, outwardly of the end of the nipple, is formed to be engaged by a part of a filter structure applied or attached to the nipple whereby when the filter is placed in position the tube will be shifted to separate the valve elements. Return flow of filtered oil from the filter is by way of the valve tube and this return flow is opposed by a spring pressed valve which the flow pressure unseats. Cessation of the return flow of filtered oil through the tube permits the valve in the tube to close. By this arrangement, if the filter unit becomes excessively loose or falls off, the spring actuated tube will shift to bring the valve elements into closed relation and no more oil can flow outwardly through the nipple. However, a pressure actuated valve means is provided for by-passing the oil from the inner end of the nipple to the inner end of the valve tube, inwardly of the spring pressed valve therein so that the closing together of the valve elements to shut-off oil flow through the nipple will not block the flow of oil back to the engine oil gallery.

Associated with the above described mounting is an adapter for coaction with existing outflow passages for the purpose of directing the oil to the nipple of the mounting through the hereinbefore referred to body passage.

The invention will be best understood from a consideration of the following detailed description taken in connection with the accompanying drawings forming a part of the specification, with the understanding that the invention is not confined to a strict conformity with the showing of the drawings but may be changed or modified within the scope of the appended claims.

In the drawings:

Fig. 1 is a view in longitudinal section through the mounting and adapter of the present invention showing the same applied to an engine body and without the filter element.

Fig. 4 is a horizontal section taken substantially on the line 4—4 of Fig. 2.

Fig. 5 is a view in side elevation of the valve tube removed from the mounting structure.

Fig. 6 is a view in side elevation of the mounting structure without the valve tube.

Fig. 7 is a view partly in edge elevation and partly in section of the adapter shown in Figs. 1 to 3.

Fig. 8 is a partial section illustrating the construction of a modified form of the adapter wherein the adapter forms an integral part of the mounting.

Figure 2:
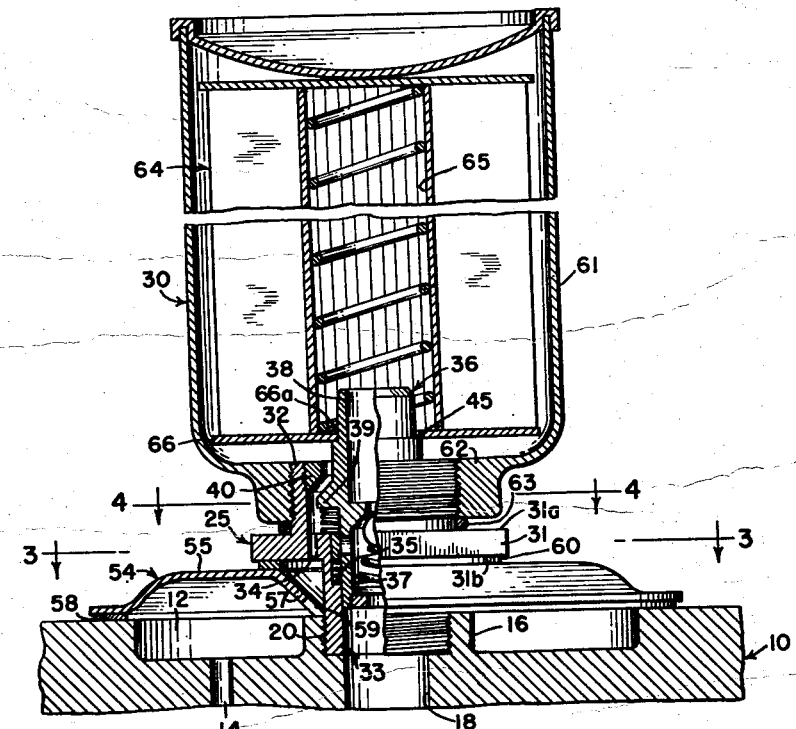
Fig. 2 is a view corresponding to Fig. 1 showing the filter applied to the mounting and showing the valve tube held in open position, the mounting and adapter being partly in elevation.
Figure 3:
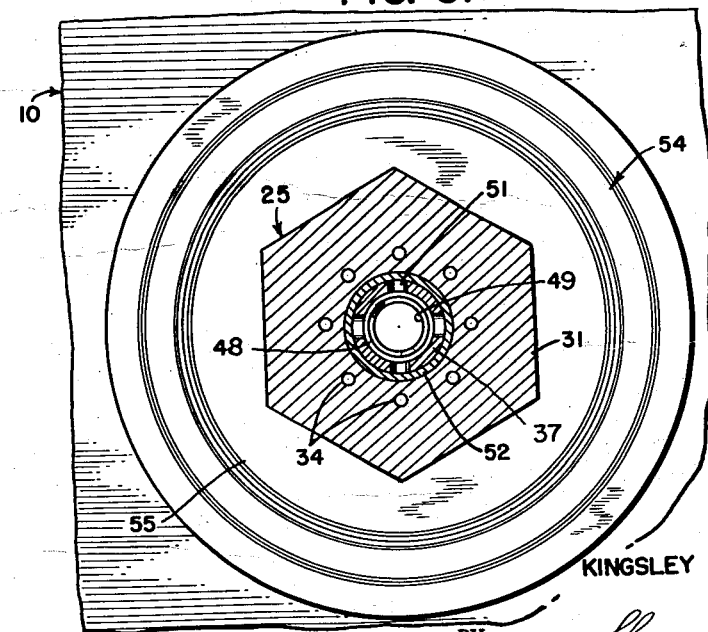
Fig. 3 is a horizontal section taken substantially on the line 3—3 of Fig. 2.

Referring now more particularly to the drawings, the numeral 10 generally designates a portion of the block of an internal combustion engine of a type or construction used in certain types of motor vehicles wherein there is provided at the lower part of the engine block an annular oil receiving recess 12 into which the oil outflow passage 14 opens. In the center of the annular recess is the boss 16, through which boss is formed the port 18 which is threaded as indicated at 20, for the attachment of a screw-on type filter of conventional design and which is replaced by the mounting and filter of the present hereinafter described invention. Such conventional type of filter when applied or mounted in position through the medium of the screw threads 20 receives dirty oil from the recess 12 and returns the oil in filtered condition to the engine oil gallery by way of the port or passage 18. As hereinbefore stated, such conventional filters are so designed that if they become clogged then the flow of oil back to the oil gallery is completely shut-off as no provision is made for by-passing the filter.

In accordance with the present invention there is provided the filter mounting which is generally designated 25 and by means of which there may be used an improved filter structure, generally designated 30 and preferably of the type disclosed and claimed in my co-pending application Ser. No. 478,359 filed December 29, 1954. This filter is designed in a manner whereby it has certain cooperative action upon the hereinafter described mounting.

The mounting 25 comprises in one embodiment a flat body 31 which may be of polygonal peripheral contour to facilitate the application of a wrench thereto for installing the mounting. The body will be described as having an outer side or face 31a and an inner side or face 31b for convenience in placing the hereinafter described parts connected with the body.

Extending from the outer side 31a of the body is the tubular nipple 32 which is externally screw threaded as shown to facilitate the application of the hereinafter described filter 30.

Extending from the opposite or inner side 31b of the body is the tubular stud 33 which is of smaller outside diameter than the nipple 32 and is coaxial with the nipple and also opens through the body into the nipple as illustrated. This stud is externally screw threaded as shown for threaded engagement in the port 18 in the placement of the mounting on the engine block.

The body 31 has formed therethrough flow passages 34 which on the inner side of the body are outside of the stud 33 and at their outer ends open into the nipple as illustrated.

The wall of the bore 33a of the stud is enlarged in the end thereof lying within the body to form the annular recess 35. This recess as shown opens into the nipple 32 for the purpose hereinafter described. The numeral 36 generally designates a valve tube which will be described as comprising a stem end portion 37 and an inlet end portion 38 for convenience in identifying and locating the ends of the tube with respect to the nipple and stud, although such portions are continuous one with the other and together form the complete tube structure.

The stem end portion 37 of the valve tube extends into the bore 33a of the stud from the nipple end thereof as illustrated and the oil inlet end portion 38 extends through the nipple and a substantial distance beyond the free or outer end thereof. The portion 37 is of an outside diameter to fit snugly in the bore 33a but is intended to have smooth axial movement therein for the purpose hereinafter described.

The inlet end portion 38 of the valve tube and the nipple 32 carry coacting or cooperating valve elements 39 and 40 respectively which function to control the flow of oil through the nipple as hereinafter described. The element 39 is in the form of a collar encircling the portion 38 of the valve tube and may be formed in one piece therewith as shown in Fig. 2 or it may be formed as a separate part and fixed on the tube and this collar functions as a valve disc having the sloping outwardly directed face 41. This element 39 lies within the nipple as shown and is of an overall diameter less than the inside diameter of the nipple so as not to impede the flow of oil through the nipple.

The element 40 forms the seat upon which the collar 39 engages and as shown is in the form of an annulus or ring which is fitted within the outer end of the nipple 32 and may be connected thereto by screw threads 42 or in any other suitable manner and the inner part of this ring element has the sloping seat face 43 which is directed inwardly and is of the same angle or inclination as the face 41 so that the latter may tightly engage thereagainst when the elements are together in valve closed position.

Encircling the stem end portion 37 and interposed between the outer face 31a of the part of the body which forms the bottom of the nipple 32 and the underside of the collar element 39, is a coil spring 44 which constantly urges the valve tube outwardly so as to bring the valve elements 39 and 40 into closed relation.

The inlet end portion 38 of the valve tube is provided with a means for engagement by a part of the applied filter 30 whereby when such filter is attached for use the valve tube will be forced inwardly against the action of the spring 44 to separate the elements 39 and 40. While this means may be of any suitable character it is here shown as being in the form of a shoulder 45 formed about the end portion 38 outwardly from the free end of the nipple 32. The cooperating relationship between this shoulder and the filter 30 will be hereinafter set forth.

The bore or passage through the tube 36 is divided in the two portions 36a and 36b by a diaphragm 46 which has an opening 47 therethrough of relatively small diameter as compared to the diameter of the bore portions of the tube.

The inner end of the bore portion 36b carries a shoulder which is here illustrated as comprising a ring 48 fixed therein by screw threads or in any other suitable manner and this shoulder supports an expansion spring 49 which at the outer end or the end remote from the shoulder 48 presses against a valve ball 50 which is of larger diameter than the opening 47 and which is designed under certain conditions to be pressed by the spring against the edge of the opening to close communication between the two bore portions of the valve tube.

The wall of the stem end portion 37 is provided with a number of ports 51 which open into the bore portion 36b and which are so located that when the valve tube is pressed inwardly by an applied filter they will be located between the inner and outer sides of the body 31 in the area in which the annular channel 35 is located.

Lying within the channel 35 is a slidable ring valve 52 between which and the inner end of the channel is located a spring 53 which encircles the portion 37 of the tube. This ring valve covers the ports 51 in normal operation of the device, that is, when the filter is properly mounted thereon so as to force the valve tube inwardly to the desired extent to bring the ports 51 to position inside the ring and preferably into the area lying between the inner and outer faces of the body 31 as shown.

To facilitate the proper working connection between the filter mounting unit 25 and the oil inlet and outlet ports of the character herein described, use is made of an adapter which may be constructed in either of two forms. One form or embodiment of the adapter is generally designated 54 and comprises an annular plate of an overall diameter to completely cover the annular recess 12 and this plate is in the form of an annulus and comprises the circular or annular bowl portion 55 having the inset rim 56 and the inwardly extending collar 57 which is in the form of the frustum cone. The open end of this cone portion is of a diameter slightly larger than the threaded portion 20 of the bore or port 18 and is adapted to position against the edge of the boss 16 as illustrated while the outer rim portion engages the face of the body 10 outside the recess 12 and preferably has interposed between it and the body 10, a gasket 58. The edge of this portion 57 which rests against the boss 16 is provided with a number of notches 59 to permit oil to flow from the recess through the conical portion 57 to the passage 34 of the body 31 when the latter is secured in working position in the engine block.

In order to prevent leakage between the adapter plate 54 and the body 31 a gasket 60 is interposed between the parts outside the diameter of the conical collar 57 as illustrated.

From the foregoing it will be seen that when the mounting 31 is secured to the engine block by the use of the adapter 54 oil flowing into the recess 12 from the passage 14 will collect in the chamber formed by the adapter and the recess and will pass through the notches 59 into the conical collar portion 57. If the valve tube 36 is pressed inwardly against the action of the spring 44, this oil will then flow through the passages 34 and escape through the outer end of the nipple 32 to pass into the attached filter.

Since the filter structure 30 here illustrated has been illustrated and described in detail in my copending application hereinbefore identified, the structure will only be described here in sufficient detail to make clear the manner in which the filter cooperates with the mounting for holding the valve tube in open position.

The unit carries, as an integral part of the shell 61 thereof, a coupling collar 62 which is internally threaded to receive the nipple 32 in the manner shown and when it is mounted on the nipple the gasket 63 is preferably interposed between the coupling collar and the body 31.

The filter unit in this shell 61 is designated 64 and this unit comprises an elongate annular fluted body having a central longitudinal passage 65 therethrough which is closed at the end nearest the mounting collar 62 by a centrally apertured disc 66. This disc is maintained in spaced relation with the inner end of the shell so that oil to be filtered will enter such end of the shell and pass radially outwardly to the outside of the filter element 64 and then flow back through the filter element toward the central passage 65 thereof to return to the engine through the opening in the center of the disc 66. This opening which is designated 66a receives the outer end of the inlet end portion 38 of the valve tube and when the filter is mounted on the threaded nipple 32 the disc 66 will be forced against the shoulder 45 of the tube and the tube will be forced inwardly as illustrated, thus opening a direct line of communication for the flow of oil through the passages 34, the nipple 32 and into the filter for return flow through the valve tube as indicated.

The pressure of the oil flow, in returning to the engine oil gallery by way of the valve tube, will force the valve ball 50 from its seat. So long as the filter remains in proper connection with the mounting, this flow will continue unless the filter element becomes clogged. In that case, increased pressure will be set up in the filter and in the nipple 32 and this pressure will be transmitted to or applied against the ring valve 52 and force it inwardly against the tension of the spring 53 so as to uncover the ports 51. Thus communication will be established between the interior of the nipple 32 and the interior of the stem portion 37 of the valve tube and a part of the oil will be returned directly to the oil gallery. Of course, if the filter becomes completely clogged then all of the oil will be returned by way of this bypass as will be readily apparent.

If for any reason the filter element becomes loose to a material degree or becomes completely disconnected from the mounting, then the spring 44 will force the valve tube outwardly and the valve elements 39 and 40 will be engaged so as to close the flow from the outer end of the nipple and the oil will then continue to flow back to the oil gallery by way of the ports 51 in the manner described. When this condition develops, the spring 49 will seat the ball 50 in the opening 47 so as to prevent oil from escaping from the outer end of the valve tube as will be readily apparent.

The spring 53 is made to have a predetermined expansion force or tension against the ring valve 52 so that the pressure with which it forces the valve outwardly will be balanced by the normal pressure of the oil entering the nipple 32 and thus the valve 52 will be held in the channel 35 in the proper position under normal conditions of operation.

As an alternative to the use of an adapter such as that indicated at 54, which is completely separable from the filter mounting 25, the body 31 may be made in the form of a circular plate 54a having a turned flange rim 56a around its periphery extending in the same direction as the stud 33. The other parts of the mounting will, of course, be exactly the same as shown in Fig. 1.

It will be seen that with this alternative construction when the stud 33 is secured in the threaded end of the passage or port 18, the edge face of the flange 56a will come into opposed relation with the side of the engine block around the recess 12 and may have a washer or gasket 58a interposed between the flange and the engine body as illustrated.

From the foregoing it will be seen that there is provided by the present invention a novel mounting structure which when used in association with a filter of the character described will give full protection to the bearings of the engine in association with which it is used since failure of the filter either by falling off of the mounting or by becoming fully clogged will not result in the shutting off of the lubricant supply to the bearing parts of the engine.

I claim:

1. A filter mounting comprising a pair of axially aligned communicating first and second tubular members joined in end to end relation, means at the free outer end of the first member for coupling a filter with the first member, an elongate valve tube having one end portion slidably mounted in the second member and having an axially extending opposite end portion projecting through and beyond the free end of the said first member, said first member being radially spaced from the portion of the valve tube therein providing a fluid passage therebetween, means for conducting fluid into said passage for discharge into a filter coupled to the first member, coacting valve elements carried by said first member and the valve tube for closing said passage when the tube is in one position in the members, resilient means within said passage connected to and between the valve tube and the members and urging movement of the tube to the said one position, means carried by the extended end portion of the tube for receiving thrust in a direction to move the tube away from said position by a part of a filter coupled to the said one member, and means at the free end of the second member for securing the mounting in operative position.

2. A filter mounting comprising a pair of axially aligned joined and communicating tubular members, means for coupling a filter with one member, an elongate valve tube having one end portion slidably mounted in the other member and extending through and beyond the free end of the said one member, said one member being spaced from the portion of the tube therein providing a fluid passage, means for conducting fluid into said passage for discharge into a filter coupled to the one member, coacting valve elements carried by said one member and the valve tube for closing said passage when the tube is in one position in the members, resilient means connected between the tube and the members and urging movement of the tube to the said one position, and means carried by the extended end portion of the tube for receiving thrust in a direction to move the tube away from said position by a part of a filter coupled to the said one member, and means operable under predetermined pressure of fluid in said passage for by-passing at least a portion of the fluid to the other member.

3. A filter mounting comprising a pair of axially aligned joined and communicating tubular members, means for coupling a filter with one member, an elongate valve tube having one end portion slidably mounted in the other member and extending through and beyond the free end of the said one member, said one member being spaced from the portion of the tube therein providing a fluid passage, means for conducting fluid into said passage for discharge into a filter coupled to the one member, coacting valve elements carried by said one member and the valve tube for closing said passage when the tube is in one position in the members, resilient means connected between the tube and the members and urging movement of the tube to the said one position, and means carried by the extended end portion of the tube for receiving thrust in a direction to move the tube away from said position by a part of a filter coupled to the said one member, and a check valve in and carried by the tube constructed for opening movement independently of the tube toward the said other member.

4. A mounting for a filter unit, said mounting comprising a body member having an inner side and an outer side, a tubular nipple on said outer side adapted to have a filter unit coupled therewith, a tubular mounting stud extending from the inner side of the body member in coaxial alignment with the nipple and communicating with the nipple through the body, a valve tube having a stem end portion slidably engaged in the stud and an inlet end portion extending through and beyond the outer end of the nipple, said inlet end portion being of smaller outside diameter than the inside of the nipple, coacting valve elements, one within and carried by the nipple and the other encircling and carried by said inlet end portion, said elements being separable to permit fluid flow through the nipple upon movement of the tube inwardly into the stud, means for admitting fluid into the nipple through the body on the outerside of the tube, means carried by said inlet end portion of the tube located axially outwardly from the end of the nipple for engagement by a filter being coupled with the nipple, and spring means connected between the tube and the outer side of the body member and urging movement of the tube in a direction to bring said valve elements into closing engagement.

5. A mounting for coupling a filter unit embodying a shell and filter element therein to a structure having a fluid outlet and a fluid inlet, said mounting comprising a body member having oppositely extending, coaxial, communicating tubular first and second extensions, means for coupling first extension with said fluid inlet, means for coupling a filter shell with the second extension, means for conducting fluid into said second extension for flow therethrough into a filter shell connected therewith, a valve tube having one end portion slidably engaged in said first extension and having its other end portion extending through and projecting beyond the second extension, valve means controlling fluid flow through said second extension and embodying two coacting members carried by said second extension and said other end portion of the valve tube extending therethrough, spring means urging movement of said tube in a direction to close said valve means, and a shoulder carried by and encircling the said other end portion of the tube at a location a substantial distance axially removed from the free end of said second tubular extension for engagement by a part of a filter element having an encasing shell attached to said second extension whereby to hold the tube in valve open position.

6. A device for mounting a filter on a structure wherein there is a fluid outlet port and a fluid return port and wherein the filter embodies a shell having an inlet neck and a filter body having a fixed centrally apertured disk concentric with said neck; said device comprising a body portion carrying on one side a tubular stud formed for insertion into said fluid return port and having on its opposite side a tubular nipple coaxial with and extending oppositely from the stud, the nipple being formed to enter and have said neck of the filter coupled therewith, the nipple being of larger inside diameter than and opening into the stud, a valve tube having one end portion fitting in the stud for limited sliding movement and having its opposite end portion extending through the nipple and beyond the outer end thereof, said opposite end portion of the valve tube being spaced from the inside of the nipple providing a fluid passageway between the valve tube and nipple, said body having a passage for passing into said passageway fluid discharged from said outlet port, an annular valve seat in and carried by the nipple in surrounding relation with and spaced from said opposite end portion of the tube, a valve collar around and carried by said opposite end portion inwardly of and for engagement on said seat upon outward movement of the tube, spring means urging said outward movement of the tube, and means carried by said opposite end portion of the tube outwardly from the outer end of the nipple for engagement by and forming a fluid tight seal with said apertured disk of the filter when the filter shell is coupled with the nipple and said tube being shifted inwardly against said spring means by the engagement of the disk with the last stated means to separate the valve collar from said annular seat.

7. The invention according to claim 6, with an adapter plate connected with said device in encircling relation therewith and for connection with the said structure and formed to receive fluid from the fluid outlet and convey the same to said body passage.

8. The invention according to claim 6, with a check valve in said tube opening inwardly toward the said one end portion thereof, and means for passing fluid from the nipple passageway into and through the said inner end portion of the tube inwardly of the check valve upon movement of the tube a predetermined distance outwardly.

9. The invention according to claim 6, with a check valve in said tube opening inwardly toward the said one end portion thereof, the tube in said one end portion having a port through the wall inwardly of said check valve, said port being positioned to establish communication with said passageway upon movement of the tube a predetermined distance outwardly, and valve means actuated by predetermined fluid pressure in the passageway to establish such communication while the valve collar and annular valve seat are separated.

10. In an oil filtering system for an internal combustion engine wherein a wall of the engine has an annular recess into which flows oil to be filtered and enicircling a port to which the oil returns from a filter wherein there is a filter having a shell carrying a threaded mounting neck and a centrally apertured disk in the shell concentric with said neck; a filter mounting and adapter comprising a flat body member having an inner side and and outer side, a threaded tubular nipple extending from the outer side with which the filter mountting neck is coupled, a tubular stud extending from the inner side of the body concentric with the nipple and opening into the shell through the body, the stud being formed to fit into said port, an oil collecting plate encircling and coupled with the mounting and having an overall diameter to cover said annular recess and engage the engine wall therearound, the plate forming with the recess a chamber into which is received the oil to be filtered, means for passing oil from the chamber through said flat body member into the nipple, a reciprocable valve tube extending through the nipple and having an inlet end portion projecting beyond the nipple and of smaller outside diameter than the interior of the nipple, said end portion being formed for entry into the aperture of the filter disk to receive filtered oil from the filter, the tube having an outlet end portion slidably engaged in the stud, coacting elements between the said one end portion of the tube and the nipple forming a valve controlling oil flow through the nipple, spring means urging the valve tube to valve closing position, and a shoulder on the said inlet end portion of the tube and engaged by the apertured disk to hold the tube in valve open position when the filter mounting neck is fully coupled with the nipple.

11. The invention according to claim 10, wherein said collector plate forms an integral part of said flat body, and said plate having a rim flange for engagement with the engine wall around the annular recess.

12. The invention according to claim 10, wherein said collector plate comprises a disk having a central frusto-conical flange for edge engagement with the engine wall around the stud, the said flange having oil passing openings, said body inner side having sealing engagement with the side of the plate opposite from said flange and outside of the major diameter of the flange.

13. A mounting for a filter unit of the type stated comprising a body having an inner side and an outer side, a tubular nipple extending from the outer side, a tubular stud extending from the inner side in axial alignment with and opening through the body into the nipple, the nipple being of an inside diameter greater than the overall diameter of the stud, an annular recess in the inside wall of the stud and opening into the nipple, a fluid passage through the body opening at one end into the nipple and opening at its other end through said inner side outside of the stud, a valve tube extending through the nipple and having one end portion projecting beyond the end of the nipple, said one end portion being of outside diameter less than the inside diameter of the nipple forming a passageway into which said one end of the fluid passage opens, the other end of the tube being slidably engaged in the stud, means within the nipple between the nipple and valve tube forming a valve for closing the passageway, spring means urging the tube to valve closing position, a shoulder formed about the said one end portion of the tube beyond the outer end of the nipple, a check-valve in the tube opening toward the inner end of the latter, a by-pass port in the wall of the tube inwardly of said check valve, and a ring valve in said annular recess, said by-pass port and ring valve being so relatively located that the port is closed thereby when the tube is in a predetermined inward position and opened when the tube is moved to a predetermined degree toward valved closed position.

14. The invention according to claim 13, wherein said ring valve has sliding movement in said annular recess and spring means in said recess resisting movement of the ring valve inwardly away from the passageway, the last named spring yieldable upon application of predetermined pressure from fluid in the passageway to open said port.

15. A mounting for a filter of the character disclosed, said mounting comprising coaxial first and second tubular members joined together in end to end relation, the first member having an inside diameter materially greater than the outside diameter of the second member, fluid passing means leading from the outer side of the second member into the first member at the joined ends of the members, an elongate valve tube of substantially constant major outside diameter through the greater part of its length from one end and terminating short of its other end in a portion of smaller diameter forming a shoulder, said major outside diameter of the tube being materially less than the inside diameter of the first member forming a fluid passage therebetween, the valve tube having a portion of said one end slidably engaged with the wall of and extending into that end of the second member which is joined to the first member, said valve tube having the opposite end portion extending through the full length of and terminating a substantial distance beyond the outer end of the first member, coacting valve elements one encircling and carried by the valve tube and the other on and secured to the inner wall of the first member, spring means within the fluid passage and connecting the first member with the valve tube and constantly urging movement of the valve tube in a direction to seat said valve elements one upon the other, a check valve carried by and within the valve tube and arranged to open toward the inner end of the tube, and said shoulder being adapted for engagement by an element of a filter attached to the first member.

16. The invention according to claim 15, with means responsive to a predetermined fluid pressure within said fluid passage for shunting the fluid into the valve tube on the inner side of the check valve for passage through the second member.

References Cited in the file of this patent

UNITED STATES PATENTS

| | | |
|---|---|---|
| 2,591,248 | Francois | Apr. 1, 1952 |
| 2,633,991 | Beatty | Apr. 7, 1953 |
| 2,743,018 | Belgarde | Aug. 24, 1956 |

FOREIGN PATENTS

| | | |
|---|---|---|
| 528,696 | France | Aug. 23, 1921 |
| 127,089 | Great Britain | May 19, 1919 |
| 711,130 | Great Britain | June 23, 1954 |